United States Patent [19]
Yunoki et al.

[11] Patent Number: 4,893,200
[45] Date of Patent: Jan. 9, 1990

[54] COMPOSITE MAGNETIC HEAD

[75] Inventors: Yutaka Yunoki, Kunitachi; Manabu Inoue, Kokubunji; Hiroyuki Wantanabe, Yokohama, all of Japan

[73] Assignee: Olympus Optical Co., Ltd., Tokyo, Japan

[21] Appl. No.: 343,062

[22] Filed: Apr. 25, 1989

Related U.S. Application Data

[62] Division of Ser. No. 270,386, Nov. 11, 1988, continuation of Ser. No. 866,491, filed as PCT JP85/00533 on Oct. 4, 1985, abandoned.

[30] Foreign Application Priority Data

| Oct. 5, 1984 | [JP] | Japan | 59-209526 |
| Oct. 24, 1984 | [JP] | Japan | 59-223617 |
| Oct. 24, 1984 | [JP] | Japan | 59-223618 |
| Oct. 24, 1984 | [JP] | Japan | 59-223619 |
| Oct. 2, 1985 | [JP] | Japan | 60-219540 |

[51] Int. Cl.$^4$ ............................................. G11B 5/02
[52] U.S. Cl. .................................... 360/67; 360/68
[58] Field of Search ............. 360/30, 19.1, 67, 68, 360/62

[56] References Cited

U.S. PATENT DOCUMENTS 4,435,734  3/1984  Hedberg et al. ............... 360/30
4,527,202  7/1985  Ohtz ............................ 360/19.1

Primary Examiner—Vincent P. Canney
Attorney, Agent, or Firm—Frishauf, Holtz, Goodman & Woodward

[57] ABSTRACT

A composite magnetic head comprising a read/write head section (6A) wherein a plurality of thin film heads are joined such that respective head gaps (R/W-1, R/W-2, ...) are aligned at predetermined intervals in the widthwise direction of tracks (T1, T2, ...), and an erase head section (6) wherein a plurality of bulk heads respectively corresponding to the thin film heads are joined such that respective head gaps (E1, E2, ...) are aligned at predetermined intervals in the widthwise direction of the tracks (T1, T2, ...), wherein the read/write head section (6A) and the erase head section (6B) are joined in the longitudinal direction of the tracks (T1 T2, ...) such that the head gaps (R/W-1) and (E1) and (R/W-2) and (E2) of the respective sections are relatively close to each other.

The thin film heads can be replaced with a plurality of bulk heads (60A). A means (SW1–SW4, 77) can be added for two magnetic heads so that a predetermined voltage-divided signal of a read signal of one magnetic head differentially acts on a read signal of the other magnetic head. A step-up transformer (31, 32) can be mounted on a base (7) so as to step up the level of the signal picked up by a head chip (6) mounted on the base (7). A read/write switch circuit (100), a write amplifier (93), and a differential input amplifier (90) can be formed into a hybrid IC and mounted on the base (7).

3 Claims, 15 Drawing Sheets

F I G. 1
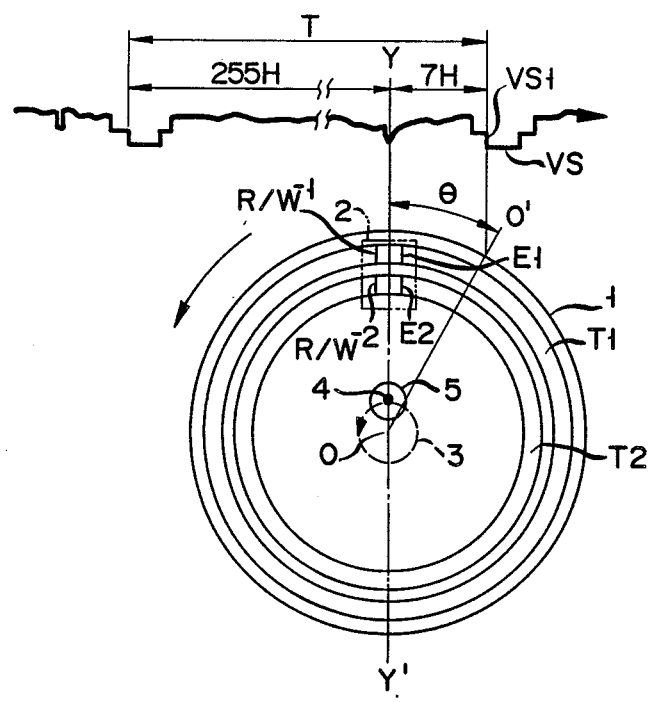
F I G. 2
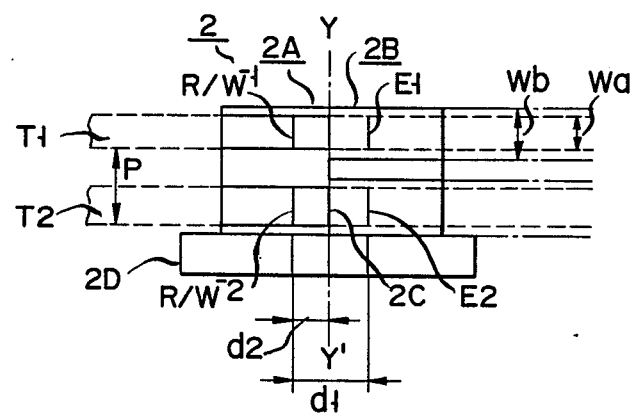

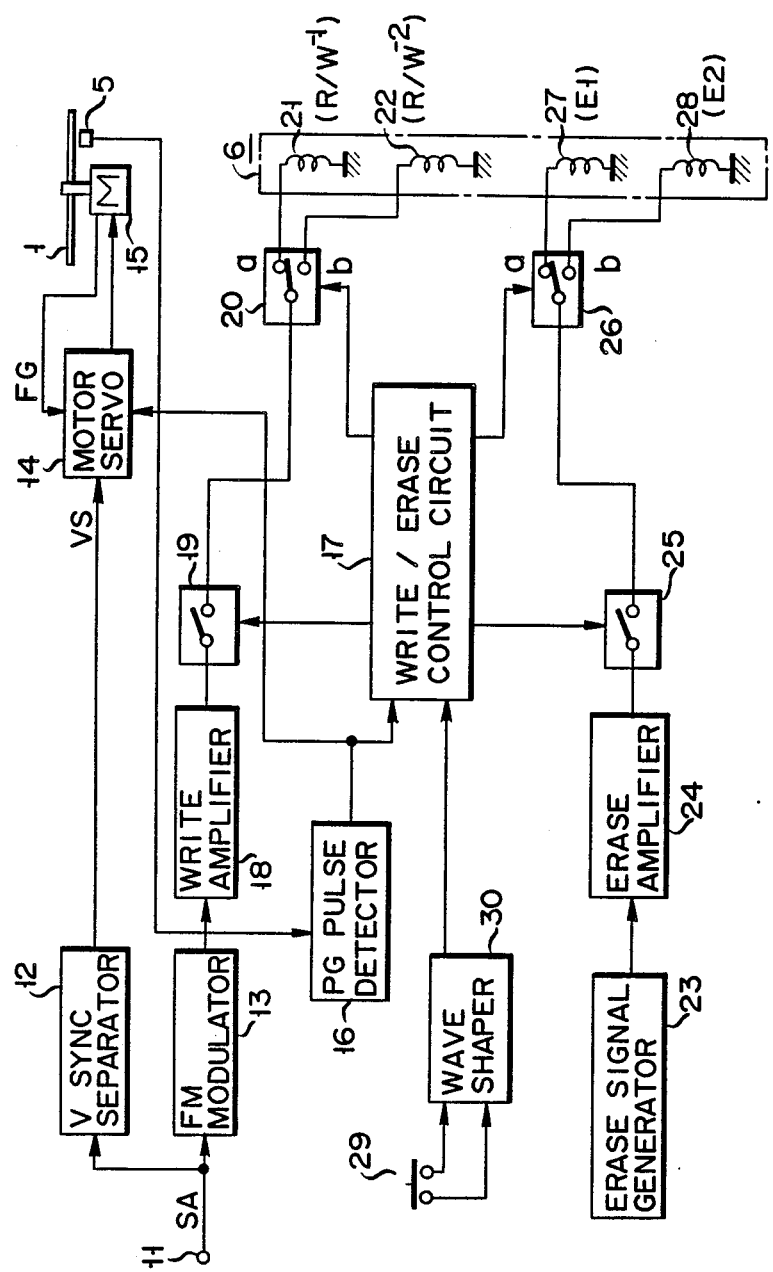
F I G. 7

FIG. 9
FIG. 10
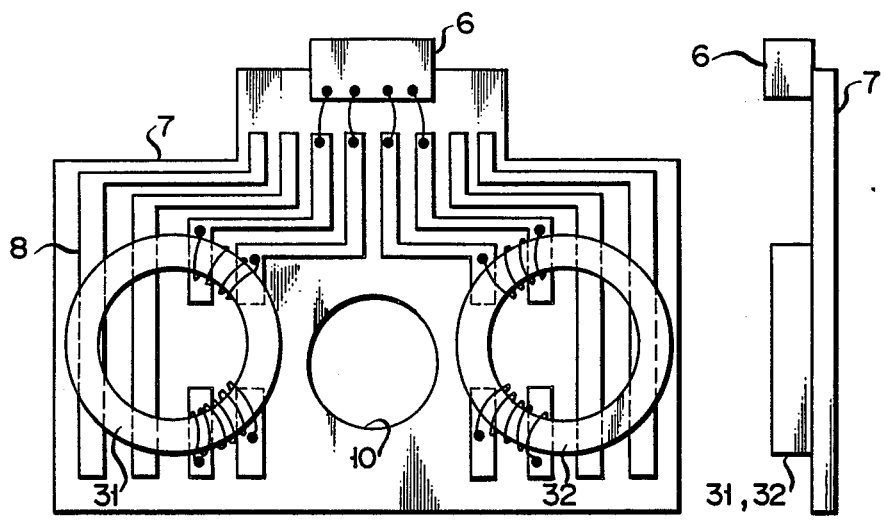
FIG. 11
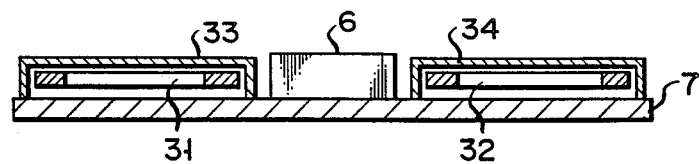

COMPOSITE MAGNETIC HEAD

This is a division of application Ser. No. 7/270,386 filed Nov. 11, 1988, which is a continuation of Ser. No. 866,491, filed as PCT JP85/00533 on Oct. 4, 1985, now abandoned.

TECHNICAL FIELD

The present invention relates to a composite magnetic head for a magnetic read/write apparatus used in a still image recording electronic camera or a digital data recording dish unit and, more particularly, to improvements in a head, a data erasing means, and a read/write control means.

BACKGROUND ART

In a conventional magnetic read/write apparatus of this type, and in particular, in a magnetic read/write apparatus for a compact electronic camera, separate read and write decks are used. However, in an apparatus using separate read and write decks, neither read nor re-write can be performed immediately after the write operation. Therefore, the apparatuses cannot satisfy the users' demand for read and re-write, if necessary, immediately after the writing of an image or the like. This also applies to digital data write. A magnetic read/write apparatus devised to solve this problem to a certain extent is know. The apparatus comprises a read/write head (hereinafter call R/W head) with integrally formed read and write heads and a read/write circuit, and can perform, read and re-write can both be performed immediately after data write for digital data. Image information can also be read immediately after the write operation. Since an erase head is not provided, however, written data cannot be erased for rewrite, making re-write of image data immediately after the write operation impossible. The main reasons why the apparatus includes no erase head are as follows. First, overwrite can be performed in writing digital data, and an erase head is not necessary. Second, all parts must be small since the space available for mounting such parts is limited in a compact electronic camera, and a relatively large part such as an erase head, cannot be used.

In addition, even if space is available and an erase head can be mounted in addition to a R/W head, the following problem is still presented. When the two heads are assembled in a compact magnetic disk apparatus using a compact magnetic disk having a diameter of about 2 inches as a recording medium, it is extremely difficult to set the head positions so that both heads maintain good head touch. As a result, the so-called spacing loss increases. When high-density write is performed with write wavelengths in the order of 0.5 $\mu$m or less, the spacing loss due to poor head touch must be reduced to a minimum. However, since good head touch for each head cannot be obtained as described above, the spacing loss increases a high-density write cannot be performed.

A frame write mode using 2 tracks is known as one image write scheme. When applied to a compact magnetic disk unit for recording in the frame write mode, two erase heads must be included besides two R/W heads. Therefore, a total of 4 heads must be assembled in a limited desk space, and it is still difficult to obtain space for mounting the heads while maintaining good head touch for each head. In this manner, assembly of an erase head involves various difficulties. In practice, therefore, image information is erased by a separate erase unit. For this reason, the above-mentioned demand for read and re-write of an image or the like immediately after it has been written has not been satisfied.

The gap width and track width of an erase head must be larger than those of an R/W head. Crosstalk must also be considered if the erase head is too close to the R/W head. In view of this, it has been considered impossible to assemble erase and R/W heads together while still maintaining the read/write performance of the apparatus.

It is, therefore, an object of the present invention to provide a compact composite magnetic head which offers good head touch, which can satisfactorily read and write various information such as image information without increasing crosstalk or spacing loss, which allows re-write immediately after write operation, and which is easy to manufacture.

It is another object of the present invention to provide a composite magnetic head which can produce a read output with an excellent S/N ratio even if the head touch is not satisfactory and crosstalk is great.

It is still another object of the present invention to provide a compact composite magnetic head which can satisfactorily read and write various information such as image information, which can re-write information immediately after writing it, which realizes a read system with an exceptionally wide band and low noise, which can suppress degradation in frequency characteristics due to increases in external noise, stray capacitance, or lead inductance, and which is easy to manufacture.

DISCLOSURE OF INVENTION

In order to achieve the above objects, a composite magnetic head of the present invention is characterized by the following construction.

A composite magnetic head according to the present invention has a read/write head section wherein a plurality of thin film heads are joined such that respective head gaps are aligned at predetermined intervals in the widthwise direction of tracks; and an erase head section wherein a plurality of bulk heads respectively corresponding to the thin film heads are joined such that respective head gaps are aligned at predetermined intervals in the widthwise direction of the tracks, wherein the read/write head section and the erase head section are joined in the longitudinal direction of the tracks, such that the head gaps of the respective sections are relatively close to each other.

Another composite magnetic head according to the present invention has a read/write head section wherein a plurality of bulk heads are joined such that respective head gaps are aligned at predetermined intervals in a widthwise direction of tracks; and an erase head section wherein a plurality of bulk heads respectively corresponding to the bulk heads are joined such that respective head gaps are aligned at predetermined intervals in the widthwise direction of the tracks, wherein the p head section and the erase head section are joined in the longitudinal direction of the tracks, such that the head gaps of the respective sections are relatively close to each other.

Still another composite magnetic head of the present invention has two magnetic heads, comprising thin film heads or bulk heads, for simultaneously picking up signals recorded on two adjacent tracks on a magnetic recording medium, and additionally has a means for switching and amplifying so that a predetermined voltage-division signal of a read signal from one magnetic head differentially acts on a read signal from the other magnetic head.

Still another composite magnetic head of the present invention has a base, a head clip mounted on the base, and a step-up transformer, mounted on the base, for stepping up the level of the signal picked up by the head chip.

Still another composite magnetic head of the present invention has a head chip mounted on a base, a read/write switch circuit for switching the head chip to a read or write system, a write amplifier for amplifying a write current and supplying the amplified current to the head chip when the head chip is connected to the write system by the read/write switch circuit, a step-up transformer, mounted on the base, for stepping up the level of a signal picked up by the head chip when the head chip is connected to the read system by the read/write switch circuit, and a differential input read amplifier for amplifying the signal stepped up by the step-up transformer, wherein the read/write switch circuit, the write amplifier, and the differential input amplifier are formed into a hybrid IC and mounted on the base.

There is provided according to the present invention, therefore, a compact composite magnetic head which has excellent head touch, which can satisfactorily read and write various information such as image information without increasing crosstalk or spacing loss, which allows re-write immediately after the write operation, and which is easy to manufacture.

There is also provided according to the present invention a composite magnetic head in which a crosstalk component included in one read signal is cancelled by a crosstalk component included in the other read signal, so that a high read output with an excellent S/N ratio can be obtained even if head touch is poor and crosstalk is considerable.

There is also provided according to the present invention a compact composite magnetic head apparatus which has a step-up transformer inserted between a magnetic head and a differential amplifier to obtain a read system with a wide band and low noise, which has a read amplifier, a write amplifier, and a read/write switch circuit formed into a hybrid IC mounted on a head base to suppress degradation in frequency characteristics due to increases in external noise, stray capacitance or lead inductance, and which is easy to manufacture.

BRIEF DESCRIPTION OF DRAWINGS

FIGS. 1 and 2 show the schematic head arrangement and structure according to a first embodiment of the present invention; FIG. 7 is a block diagram showing the configuration of a control system which allows the composite head of the third embodiment to perform write and erase operations; FIGS. 9 to 11 are views showing the construction of a composite head with a read step-up transformer according to a fourth embodiment of the present invention, in which FIG. 9 is a plan view, FIG. 10 is a side view, and FIG. 11 is a sectional view. FIGS. 18 to 20 are views showing the mounting state of a hybrid IC in the sixth embodiment, in which FIG. 18 is a plan view from the rear surface of a base, FIG. 19 is a plan view from the front surface of the base, and FIG. 20 is a side view. FIGS. 23 to 25 show a modification in the surface shape of the composite head in FIGS. 2 to 4, in which FIG. 23 is a plan view, FIG. 24 is an end view, and FIG. 25 is a side view.

BEST MODE OF CARRYING OUT THE INVENTION

Figure 3:
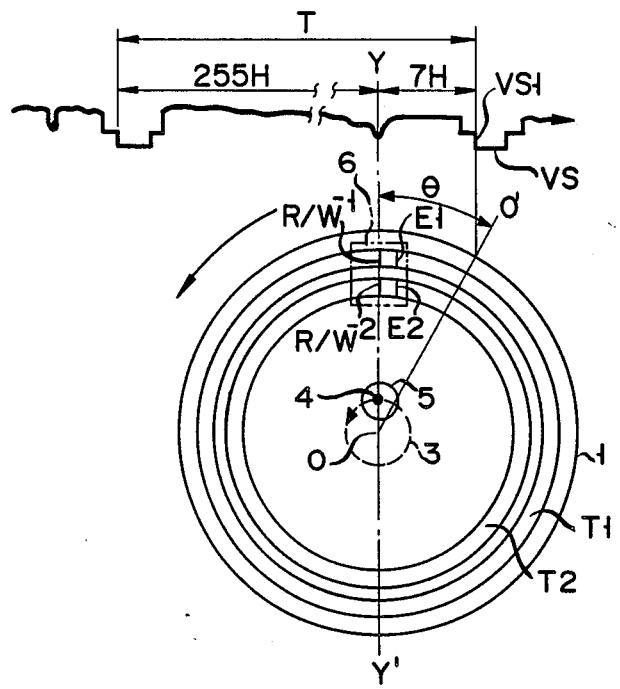
FIGS. 3 and 4 show the schematic head arrangement and structure according to a second embodiment of the present invention.

FIGS. 1 and 2 show a schematic head arrangement and structure according to a first embodiment of the present invention. Referring to FIG. 1, reference numeral 1 denotes a rotary magnetic disk as a magnetic recording medium. Disk 1 is rotated by a motor (not shown) at a rotational frequency of 3,600 rpm (in the case of the NTSC system) counterclockwise as indicated by the arrow around point P. Write tracks T1, T2, . . . are concentrically formed on a write surface of magnetic disk 1 by composite magnetic head 2. PG yoke 4 as a rotational position detection index for disk 1 is mounted at one point on the circumference of hub 3 at the center of disk 1. PG coil 5 as a pulse detection means is mounted at one point on a rotation path of PG yoke 4 of the apparatus housing (not shown). PG coil 5 is arranged at the non-write side of magnetic disk 1, i.e., at the opposite side of composite magnetic head 2. PG coil 5 extracts a pulse signal induced upon interlinkage with the magnetic fluxes produced by PG yoke 4 upon rotation of magnetic disk 1.

When field write is performed during still image write on magnetic disk 1, still image information for different fields is written in first and second tracks T1 and T2. When frame write is performed, still image information for two consecutive fields is written in tracks T1 and T2. In either case, the write start and end points are defined when PG yoke 4 comes to the position illustrated in FIG. 1, i.e., when it is on line O-Y when the line connecting central point O of magnetic disk 1 and the center of PG coil 5 is represented by line Y-Y'. In other words, composite magnetic head 2 is switched by a PG pulse obtained when PG yoke 4 comes to the center of PG coil 5. When image write is performed, in the NTSC system, 262 H (H means a horizontal line) are written in one track. The switching point is set at a timing which is, e.g., 7 H earlier than leading edge VS1 of vertical sync signal VS. Therefore, leading edge VS1 of vertical sync signal VS is written at angle O-O' shifted by $\theta$ {360°×(7.262)} from line O-Y as a switching point on magnetic disk 1. As a result, the noise component generated at the switching point is located near a corner of the read image and can be ignored in practice.

FIG. 2 is a plan view showing the structure of composite magnetic head 2 shown in FIG. 1. Composite magnetic head 2 can continuously read or write, without moving, various information such as image information or digital data and can erase written information as needed. In composite magnetic head 2, first read/write gap R/W-1 and first erase gap E1 matched with first track T1 are set apart by predetermined distance d1 along track T1 substantially along the relative movement direction of magnetic disk 1, i.e., a magnetic recording medium. Second read/write gap R/W-2 and second erase gap E2 matched with second track T2 are similarly set apart by predetermined distance d2 along second track T2.

According to a method of manufacturing composite head 2 as described above, a portion of 2-track read/write head 2A to the left of line Y-Y' and a portion of 2-track read/write head 2B to the right of line Y-Y' are arranged separately. These portions are joined together with crosstalk preventing magnetic shielding member 2C sandwiched therebetween. Head 2 can be easily manufactured by this method.

Referring to FIG. 2, reference symbol P denotes a track pitch; W, a read/write gap width; and Wb, an erase gap width. Composite magnetic head 2 is mounted on the apparatus housing such that the joint portion sandwiching magnetic shielding member 2C is on line O-Y in FIG. 1. Then, the four gaps, i.e., read/write gaps R/W-1 and R/W-2 and erase gaps E1 and E2, are set to provide substantially the same head touch with respect to the write side of disk 1.

In this manner, only one composite magnetic head 2 is needed, and installation space is the same as for the conventional head in an electronic camera or the like. When a read/write circuit (not shown) is connected to head 2, read, write, and erase operations can be performed as needed.

In the first embodiment shown in FIGS. 1 and 2, read/write gaps R/W-1 and R/W-2 of composite magnetic head 2 are set off sideways from line Y-Y' by distance d2 (about ½ distance d1), thus from the switching point by distance d2. When composite magnetic head 2 is moved in the radial direction of disk 1, inclination angles of read/write gaps R/W-1 and R/W-2 with respect to tracks T1, T2, . . . change, and the azimuth angles also change. In order to prevent this, read/write gaps R/W-1 and R/W-2 must be inclined slightly with respect to line Y-Y' in advance. However, with such an arrangement, the positional relationship of gaps R/W-1 and R/W-2 with erase gaps E1 and E2 becomes hard to control, making head manufacture difficult. In composite magnetic head 2 shown in FIGS. 1 and 2, magnetic shielding member 2C for preventing crosstalk is present at the head joint portion. Therefore, distance d1 between read/write gaps R/W-1 and R/W-2 and erase gaps E1 and E2 increases accordingly. It then becomes relatively difficult to obtain optimal head touch.

Figure 4:
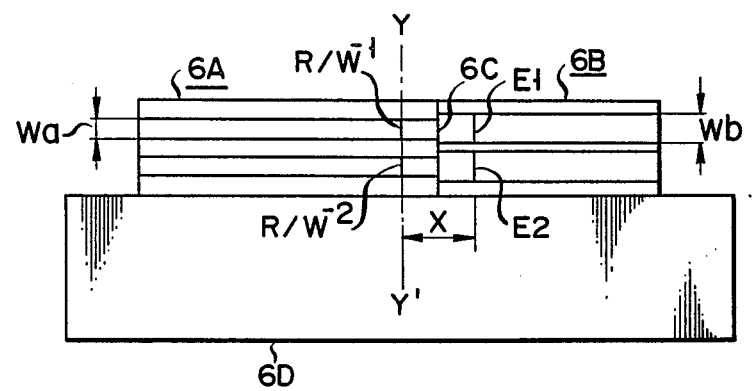

FIGS. 3 and 4 show the schematic head arrangement and head structure according to a second embodiment of the present invention, which includes an improvement over the first embodiment described above. The overall construction of the head according to the second embodiment is the same as that of the first embodiment. However, in this embodiment, read/write gaps R/W-1 and R/W-2 of composite magnetic head 6 are at the center of head 6 and on line Y-Y'. Erase gaps E1 and E2 are at positions shifted from read/write gaps R/W-1 and R/W-2 to the upstream side by X (about 400 μm, corresponding to a time difference of about 1 H of the video signal). The head touch is designed to be optimal on read/write gaps R/W-1 and R/W-2.

In this embodiment, the spacing loss is reduced and performance is improved over the first embodiment. Erase gaps E1 and E2 provide poorer head touch than read/write gaps R/W-1 and R/W-2. However, since gap width Wb is larger than gap width Wa of read/write gaps R/W-1 and R/W-2, a slight degradation in performance can be neglected. As will be described later, the write operation is performed only once for each rotation of the disk. However, the erase operation can be continuously performed over numerous rotations of the disk. Therefore, the poor head touch of erase gaps E1 and E2 can be compensated for.

In this embodiment, read/write gaps R/W-1 and R/W-2 are on line Y-Y'. Therefore, when composite magnetic head 6 is moved in the radial direction of disk 1, the inclination angles (azimuth angles) of gaps R/W-1 and R/W-2 with respect to the tracks do not change. Azimuth loss is thus prevented. Since the azimuth angles of erase gaps E1 and E2 are not affected for the reason described above, erase gaps E1 and E2 can be arranged substantially parallel to read/write gaps R/W-1 and R/W-2. The head of the second embodiment is therefore easier to manufacture than that of the first embodiment.

In order to obtain good head touch, distance X between read/write heads R/W-1 and R/W-2 and erase heads E1 and E2 is preferably at a minimum. Thus, magnetic shielding member 2C at the joint portion between read/write head section 6A and erase head section 6B is preferably as thin as possible. However, with such an arrangement, crosstalk between read/write gaps R/W-1 and R/W-2 and erase gaps E1 and E2 poses a problem. This can be solved with suitable control of the write and erase timings by a control system to be described later.

In general, a thin film head is considered to be preferable as a multi-channel head with little crosstalk. A known read/write thin film head is described in, e.g., "Thin film head for high-density recording sheet", Denshi-Tsushingakkai, Giken-Hokoku, VR-63-8, (June 6, 1984) pp. 55–60. While a thin film read/write head can be manufactured, it is difficult to manufacture a thin film erase head for assembly with the read/write head. The reason for this is as follows. When a 7-MHz luminance signal recorded on a metal disk having coercive force Hc≈1,400 Oe is erased at −40dB, a magnetization of 2 ampere-turns or more is required. However, it is difficult to increase the number of turns, and it is also difficult to obtain a large cross-sectional coil area in a thin film head. Thus, it is difficult to obtain a high ampere-turn. In order to prepare a core for passing large magnetic fluxes, the cross-sectional area of the core must be increased. However, in a thin film head, since the core Is formed by sputtering or the like, manufacture of a core having a large cross-sectional area is time-consuming and costly.

Figure 5:
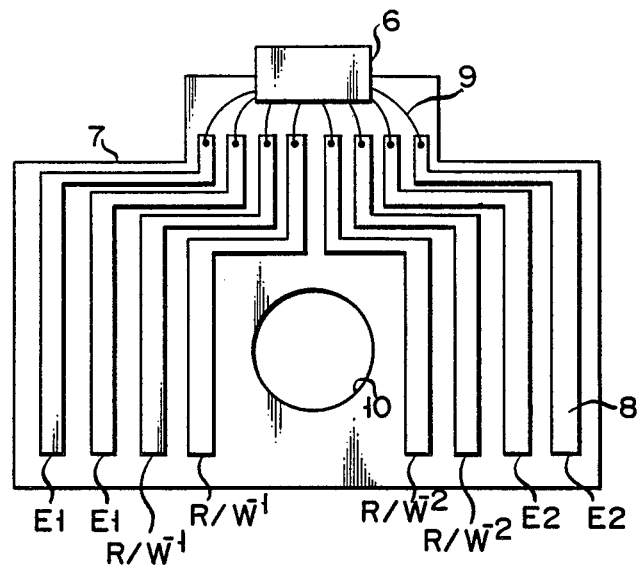
FIGS. 5 and 6 are a plan view of a longitudinal sectional view, respectively, of a composite head according to a third embodiment of the present invention.
Figure 6:
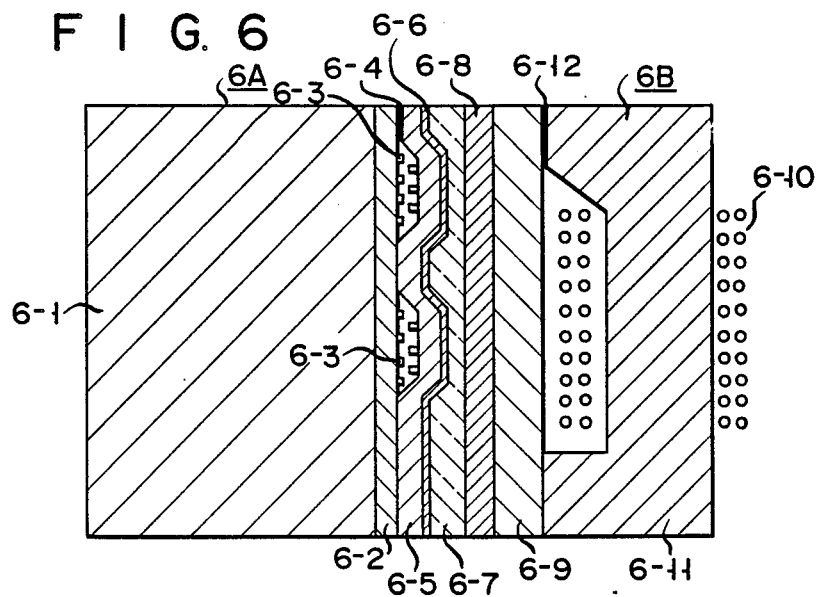

FIGS. 5 and 6 show the structure of a composite head according to a third embodiment of the present invention made in consideration of the above situation. As shown in FIG. 5, composite head 6 is mounted at an end of mounting base 7, and the head coil is connected to printed circuit board 8 on base 7 through lead wires 9. Referring to FIG. 5, reference numeral 10 denotes a mount hole. In general, a sufficient space margin is not available around the head. Therefore, small mounting base 7 having an area of about $5 \times 10M$ mm$^2$ is used.

FIG. 6 is a longitudinal sectional view of composite head 6. Thin film read/write head section 6A is obtained in the following manner. A magnetic material having a high saturation magnetic flux density such as cendust is deposited by sputtering or the like on ferrite substrate 6-1 with polished ends to a thickness of about several microns to provide lower core 6-2. After insulating lower core 6-2 by SiO$_2$ deposition, thin film coil 6-3 of copper or the like is formed for 5 to 10 turns by a processing technique such as sputtering or a combination of deposition and etching. SiO$_2$ is sputtered thereover to a thickness of about 0.1 $\mu$m to 0.2 $\mu$m to form read/write gap section 6-4. Upper core 6-5 of the same material as that of the lower core is formed on section 6-4 by sputtering or the like, protective film 6-6 is formed thereover, and protective plate 6-8 is adhered thereon with adhesive glass 6-7. Bulk erase head section 6B is prepared in the following manner. Magnetic core 6-9 of cendust or the like is joined with magnetic core 6-11 of the same material around which coil 6-10 having 10 to 20 turns is wound to provide erase gap section 6-12. Composite head 6 is obtained by integrally forming head sections 6A and 6B. A magnetic shielding plate is preferably sandwiched between sections 6A and 6B.

In composite magnetic head 6 of such a construction, since the thickness from gap 6-4 to plate 6-8 in thin film read/write head section 6A can be set to be 30 $\mu$m or less, the distance between the gaps can be significantly reduced. Therefore, good head touch can be obtained at both read/write gap section 6-4 and erase gap section 6-12. Even if read/write head section 6A is formed for two channels along the widthwise direction of tracks, since read/write head section 6A consists of a thin film, crosstalk during signal read can be suppressed to about $-40$ dB. Section 6A is therefore suitable for a multi-head structure and is easy to manufacture. Since erase head section 6B is a conventional bulk head, a high current can be easily flowed and a large magnetic flux can be generated. Therefore, a luminance signal of about 7 MHz can be erased to a level of $-40$ dB or less.

FIG. 7 is a block diagram showing the configuration of a control system for performing write and erase operations using composite head 6. The characteristic feature of the control system is that a PG pulse for switching the write head is also used for switching the erase head. A video signal from an imaging device such as a solid-state imaging element or from an external TV signal generator is supplied to terminal 11, at the left end of the drawing. The video signal is supplied to vertical sync signal separator 12 and FM modulator 13. The video signal supplied to vertical sync signal separator 12 is subjected to separation only of vertical sync signal VS, which is supplied to motor servo circuit 14. In response to an FG pulse supplied as a rotational frequency signal from disk drive motor 15, motor servo circuit 14 performs speed servo of motor 15 and keeps the speed of motor 15 at 3,600 rpm. Magnetic disk 1 is mounted on the shaft of motor 15. The PG yoke mounted near the center of disk 1 is detected by PG coil 5, and 60 PG pulses are sent per second. The PG pulses are shaped by PG pulse detector 16, and supplied to motor servo circuit 14 and to write/erase control circuit 17 to be described later. In response to the vertical sync signal and PG pulse, motor servo circuit 14 performs motor phase servo so that the PG pulse and leading edge VS1 of the vertical sync signal have a time difference of 7 H (63.5 $\mu$m$\times$7).

After the video signal supplied to FM modulator 13 is FM modulated, it is current-amplified by write amplifier 18 and supplied to excitation coils 21 and 22 corresponding to read/write gaps R/W-1 and R/W-2 of head 6 through switches 19 and 20.

An erase signal output from erase signal generator 23 comprising an oscillator is current-amplified by erase amplifier 24 into an erase current. The erase current is supplied to excitation coils 27 and 28 corresponding to erase gaps E1 and E2 of head 6 through switches 25 and 26.

The ON/OF and selection control of switches 19, 20, 25, and 26 is performed by control circuit 17. In response to an operation instruction from operation instruction switch 29 (a release switch in the case of an electronic camera), control circuit 17 is activated in synchronism with the PG pulse and controls switches 19, 20, 25, and 26.

Figure 8:
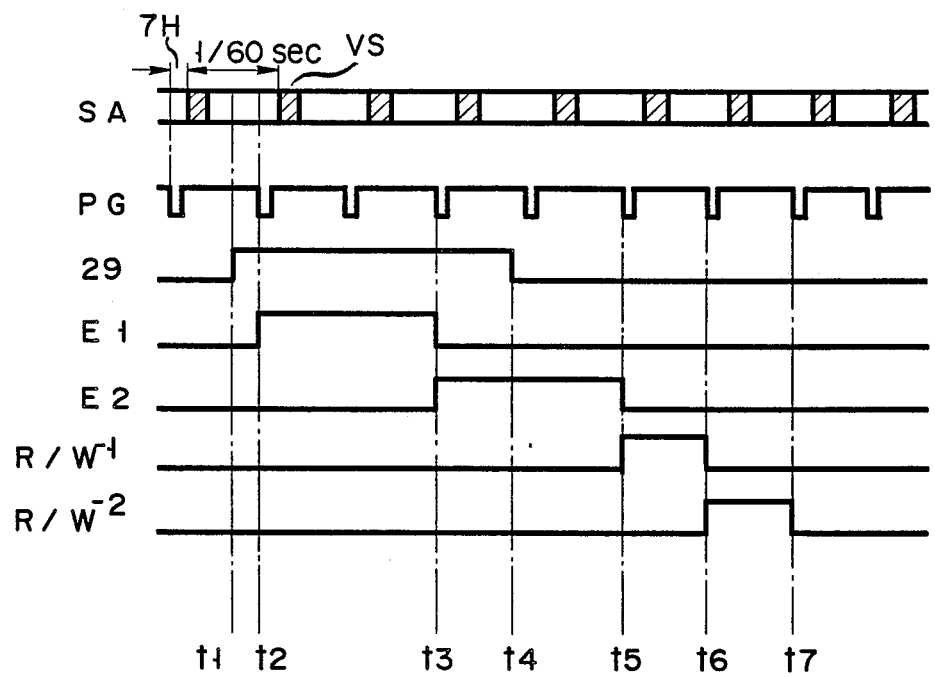
FIG. 8 is a timing chart showing the operation timings of the respective blocks of the control system shown in FIG. 7.

FIG. 8 is a timing chart showing the operation timing of the control system shown in FIG. 7. Assume a case wherein vertical sync signal VS is supplied every 1/60 sec and the PG pulse is input at a timing 7 H before the leading edge of signal VS, as shown in FIG. 8. When operation instruction switch 29 is turned on at time t1, control circuit 17 generates a control signal at time t2 at which the first PG pulse is input. In response to the control signal, switch 25 is turned on, and switch 26 assumes the state shown in FIG. 7, i.e., it is switched to contact a side. Then, erasing by erase gap E1 can be performed. In this example, erasing by erase gap E1 is performed for a time interval corresponding to 2 rotations of disk 1. At time t3, only switch 26 is switched to contact b side. Therefore, erasing by erase gap E2 can be performed. When operation instruction switch 29 is turned off at time t4, the erase operation ends after only 1 cycle (4 rotations of the disk) and the write operation is started. When a PG pulse is input at time t5, the erase operation is ended, switch 19 is turned on in response to an output from control circuit 17, and switch 20 is switched to contact a side. Therefore, the write operation by read/write gap R/W-1 can be performed for a time interval corresponding to one rotation of disk 1. Switch 20 is switched to contact b side at time t6, at which the next PG pulse is supplied. Then, the write operation by read/write gap R/W-2 can be performed.

In this manner, erase and write can be performed for 6 fields (1/10 sec) over 2 tracks. Since gaps E1 and R/W-1 and gaps E2 and R/W-2 are activated with time differences, there is little crosstalk. Since not only read/write gaps R/W-1 and R/W-2 but also erase gaps E1 and E2 are controlled to synchronism with the PG pulse, dead time is not generated. Since erasing is performed for at least a time interval corresponding to one rotation of disk 1, a non-erased portion does not remain. The erase cycle can be extended to a time interval corresponding to 2 rotations of disk by shifting the timing for turning off operation instruction switch 29.

FIGS. 9 to 11 show a fourth embodiment of the present invention and illustrate a case wherein read stepup transformers 31 and 32 are added to the composite head apparatus in FIG. 5. As shown in FIGS. 9 to 11, two read step-up transformers 31 and 32 are mounted through insulating layers (not shown) for a 2 channel read operation on mounting base 7 having composite head 6 fixed to one end thereof. Although not illustrated in (a), magnetic shielding cases 33 and 34 are provided to cover transformers 31 and 32 shown in (c).

With the composite head apparatus having the above construction, the distance from the head to transformers 31 and 32 is minimized, noise pickup is reduced, and the S/N ratio is improved. Since the wiring resistance is reduced to a minimum, frequency characteristics are improved. Magnetic permeability $\mu$ of transformers 31 and 32 is preferably high. In this example, transformers 31 and 32 have magnetic permeability $\mu=500$ at 10 MHz. When magnetic permeability $\mu$ is low, the number of turns at the secondary windings in transformers 31 and 32 must be increased, thus degrading frequency characteristics.

Figure 12:
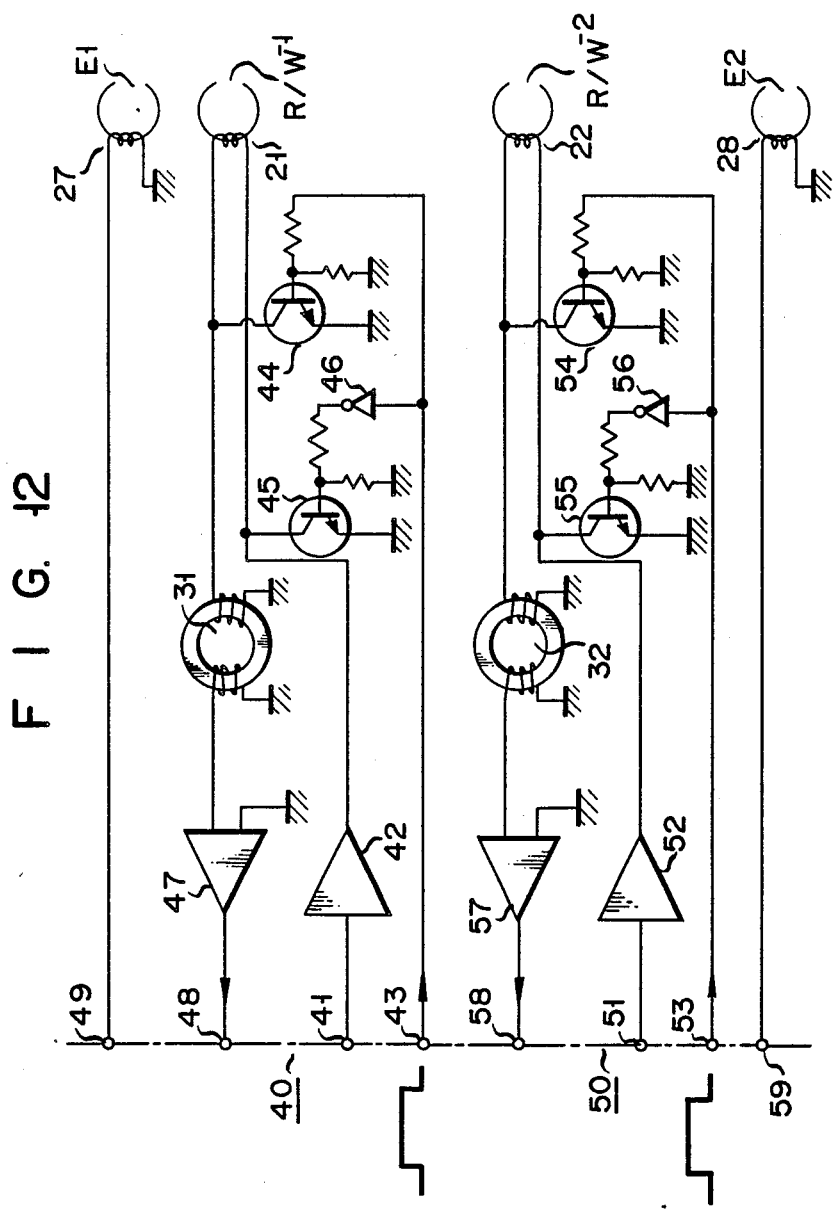
FIG. 12 is a circuit diagram for when the composite head shown in FIGS. 9 to 11 is used.

FIG. 12 is a circuit diagram of the case wherein step-up transformers 31 and 32 are mounted. Since first and second channels 40 and 50 have an identical structure, a description will be made only for first channel 40. The parts of second channel 50 are designated by reference numerals 50 to 59 and a detailed description thereof will be omitted.

In the write mode, write information input at terminal 41 is supplied to write amplifier 42, and the gate signal supplied to terminal 43 goes to "H" level. Therefore, write transistor 44 is turned on. At this time, since the gate signal of read transistor 45 is set at "L" level by inverter 46, transistor 45 is OFF. The write information therefore flows through coil 21 of the read/write head and transistor 44 and is written. The primary winding coil of read step-up transformer 31 does not influence the write operation.

In the read mode, the gate signal goes to "L" level. Therefore, write transistors 44 is turned off, and read transistor 45 is turned on. The read information obtained at coil 21 of the read/write coil is stepped up by read step-up transformer 31 and is output from terminal 48 through read amplifier 47. Since the output terminal of write amplifier 42 is short-circuited by transistor 45, the write circuit does not influence the read operation. In FIG. 12, reference numeral 49 denotes an erase signal supply terminal. When the overall circuit shown in FIG. 12 is formed into a hybrid IC and mounted on mounting base 7, the number of wiring layers to be formed is reduced and the S/N ratio and frequency characteristics are improved.

Figure 13:
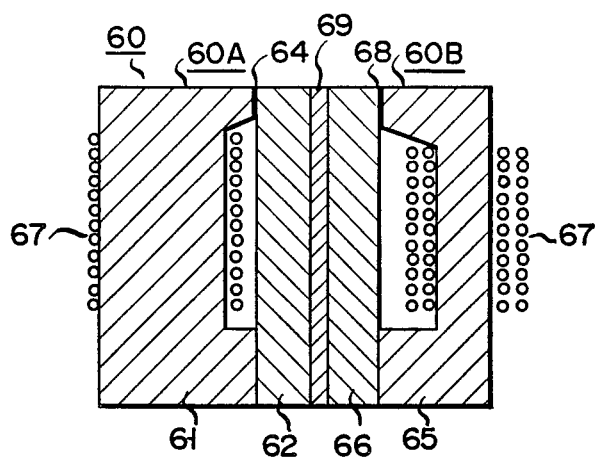
FIG. 13 is a sectional view showing the structure of a bulk-type composite magnetic head according to a fifth embodiment of the present invention.

FIG. 13 shows a bulk-type composite head 60 in a fifth embodiment of the present invention. As shown in FIG. 13, in this bulk-type composite head 60, winding 63 and magnetic cores 61 and 62 of cendust or the like constitute bulk-type read/write head section 60A with gap 64. Similarly, winding 67 and magnetic cores 65 and 66 of cendust or the like constitute bulk-type erase head section 60B. Two sections 60A and 60B are joined and fixed with magnetic shielding member 69 sandwiched therebetween. Winding 63 of read/write head section 60A has about 10 turns and can flow a write current of about 50 to 70 mA. Winding 67 of erase head section 60B has about 10 to 20 turns and can flow an erase current of about 100 to 200 mA.

In bulk-type composite head 60 in FIG. 13, a conventional bulk head manufacturing technique can be directly utilized, and manufacture is thus easy. When a multi-head is to be obtained, however, crosstalk in the read mode is higher than in the composite heads described above. If such a multi-head is used in combination with the crosstalk removing circuit to be described below, crosstalk can be suppressed to a satisfactory level.

Figure 14:
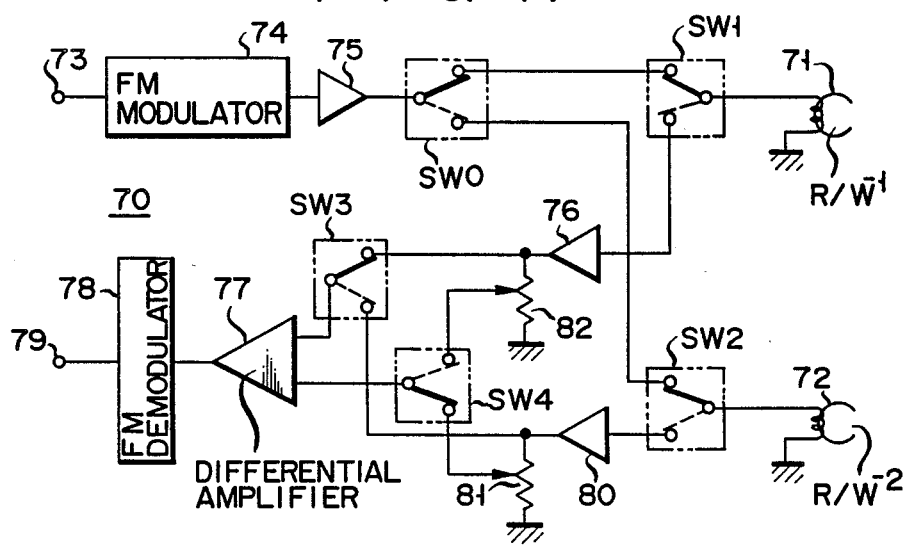
FIG. 14 shows a crosstalk removing circuit used together with the bulk-type composite head in FIG. 13.

FIG. 14 is a circuit diagram showing crosstalk removing circuit 70. In FIG. 14, reference symbol SW0 denotes a write mode head selection switch which selects one of first and second read/write heads 71 and 72. Reference symbols SW1 and SW2 denote read/write switches for first and second read/write heads 71 and 72; the solid lines correspond to the write side and the broken lines correspond to the read side. Reference symbol SW3 denotes a read mode head selection switch; the solid line corresponds to first head 71 and the broken line corresponds to second head 72. Reference symbol SW4 denotes a read signal selection switch as a crosstalk countermeasure. When switch SW3 selects first read/write head 71, switch SW4 selects the second read/write head. However, when switch SW3 selects second read/write head 72, switch SW4 selects first read/write head 71.

Crosstalk removing circuit 70 described above operates in the following manner. In the write mode, switches SW0, SW1, and SW2 are set as indicated by the solid lines. When a write signal is supplied to terminal 73, it is FM modulated by FM modulator 74, amplified by write amplifier 75, and supplied to and written by first read/write head 71 through switches SW0 and SW1. When switch SW0 is switched as indicated by the broken line, the write signal is supplied to and written by second head 72 through switch SW2. In the read mode, switches SW1 and SW2 are switched as indicated by the broken lines. When the read operation by first read/write head 71 is performed, switches SW3 and SW4 are set as indicated by the solid lines. The read signal picked up by first read/write head 71 is supplied as one input of differential amplifier 77 through switch SW1, read amplifier 76, and switch SW3. The signal from differential amplifier 77 is demodulated by FM demodulator 78 and output from terminal 79. The read signal picked up by second read/write head 72 is supplied to voltage divider 81 through switch SW2 and read-amplifier 80, divided thereby into a signal voltage of a predetermined ratio, and supplied as the other input to differential amplifier 77 through switch SW4. Therefore, differential amplifier 77 produces a difference signal between the read signal from the first read/write head and the voltage-divided signal of the read signal from second read/write head 72. As a result, the crosstalk component is cancelled in the signal from differential amplifier 77, and the signal is output as a final read signal. When the read output from second read/write head 72 is extracted, switches SW3 and SW4 are switched to the side indicated by the broken lines. Then, the difference between the read signal from second read/write head 72 and the read signal from first read/write head 71 is obtained, and the crosstalk component is cancelled in the same manner as described above.

FIGS. 15 to 22 show a sixth embodiment of the present invention, wherein a hybrid IC is mounted on a base.

Figure 15:
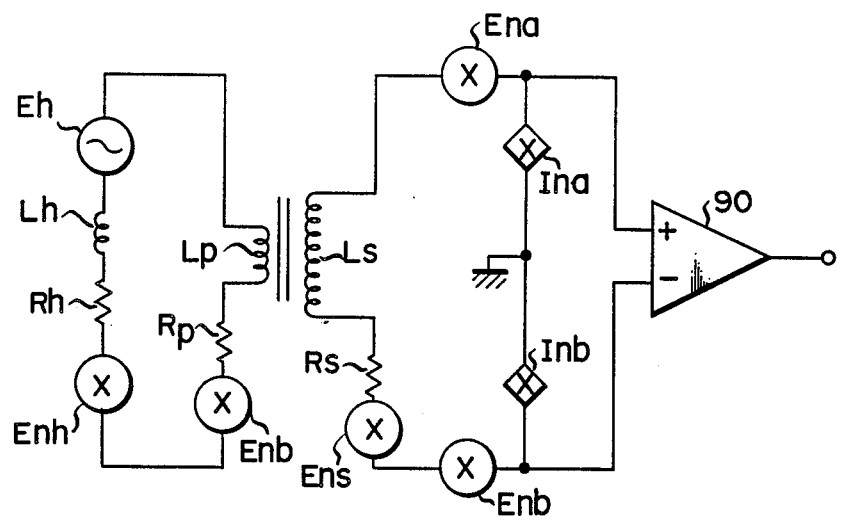
FIG. 15 is an equivalent circuit diagram of noise in a read amplifier system in a sixth embodiment of the present invention.

FIG. 15 is an equivalent circuit diagram of noise in a head-read amplifier system including a step-up transformer. Referring to FIG. 15, reference symbol Lh denotes the inductance of head H; Rh, the resistance of head H; Lp, the inductance of the primary winding of step-up transformer T; Rp, the resistance of the primary winding of step-up transformer T; Ls, the inductance of the secondary winding of step-up transformer T; and Rs, the resistance of the secondary winding of step-up transformer T. Reference symbol Eh denotes the head output voltage; Enh, the thermal noise of Rh; Enp, the thermal noise of Rp; Ens, the thermal noise of Rs; Ena and Enb, the noise voltages of differential input read amplifier 90; and Ina and Inb, the noise currents of differential input read amplifier 90.

In order to obtain a head-read amplifier system with a good S/N ratio, all noise must be reduced, and the turn ratio Ns/Np of step-up transformer T must be increased. When the read amplifier receives differential inputs rather than a single input, En is doubled and In is halved. The input capacitance (not shown) is also halved. When the step-up ratio, i.e., the turn ratio Ns/Np is increased, the values of Is and Rs are increased and considerable noise is generated by the flowing of In. However, in the case of differential inputs, since In is halved, the above effect is minimized. Ci is also halved to obtain a high band. Therefore, the read amplifier comprises a differential input amplifier and its input elements, and operation conditions are set so that En is small and In is large (En and In are inversely proportional), e.g., by using a transistor.

Figure 16:
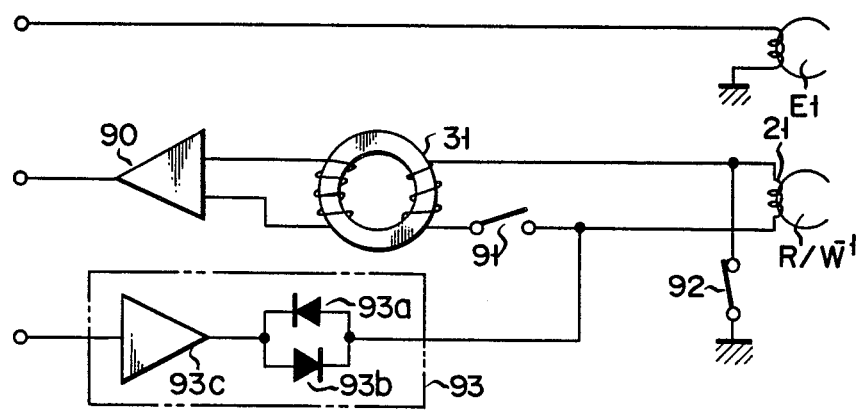
FIG. 16 illustrates the principle of the sixth embodiment.

FIG. 16 shows the principle of the embodiment based on this arrangement. In the read mode, read/write switch 91 is OFF and read/write switch 92 is ON. A write signal is supplied to coil 21 of read/write head R/W-1 through write amplifier 93 consisting of amplifier 93c and reverse-parallel connected diodes 93a and 93b. In the read mode, read/write switches 91 and 92 are turned off. A read voltage induced at coil 21 is stepped up by stepup transformer 31, and amplified by differential input amplifier 90.

Figure 17:
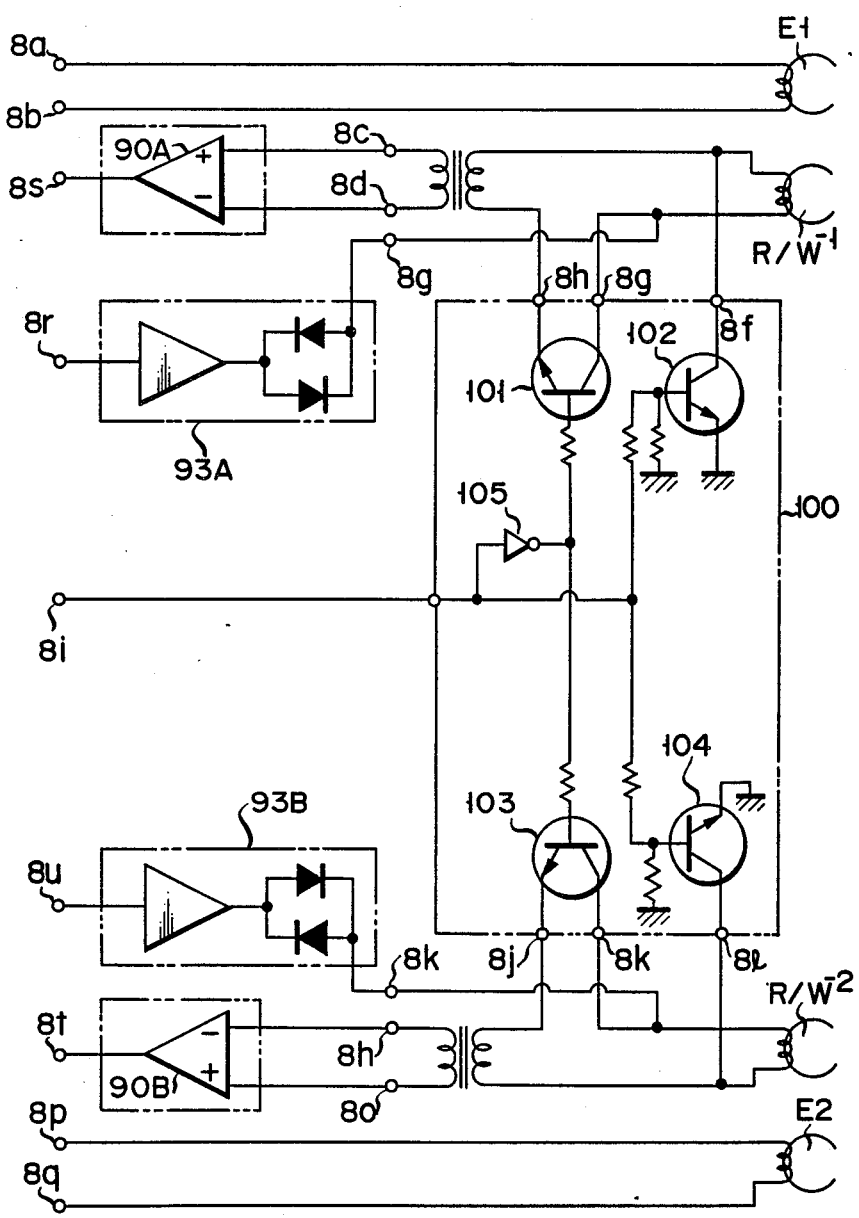
FIG. 17 is a circuit diagram showing the circuit configuration of the sixth embodiment.

FIG. 17 is a circuit diagram showing the circuit configuration of this embodiment. In FIG. 17, reference numeral 100 denotes a read/write switch circuit having two transistors corresponding to read/write switches 91 and 92 described above. Read/write switch circuit 100 consists of four transistors 101, 102, 103, and 104, and inverter 105. Reference symbols 8a to 8u denote terminals. When a signal of "H" level is input from terminal 8i in the write mode, the "H" level signal is directly supplied to the bases of transistors 102 and 104, and is inverted by inverter 105 to an "L" level signal which is supplied to the bases of transistors 101 and 103. Therefore, transistors 102 and 104 are turned on, and transistors 101 and 103 are turned off. When an "L" level signal is supplied from terminal 8i in the read mode, transistors 101 and 103 are turned on and transistors 102 and 104 are turned off, in the opposite manner to the case described above.

The portions surrounded by the dotted lines in FIG. 17, i.e., differential input amplifiers 90A and 90B, write amplifiers 93A and 93B, and read/write switch circuit 100, are formed into a hybrid IC and mounted on a head base.

Figure 18:
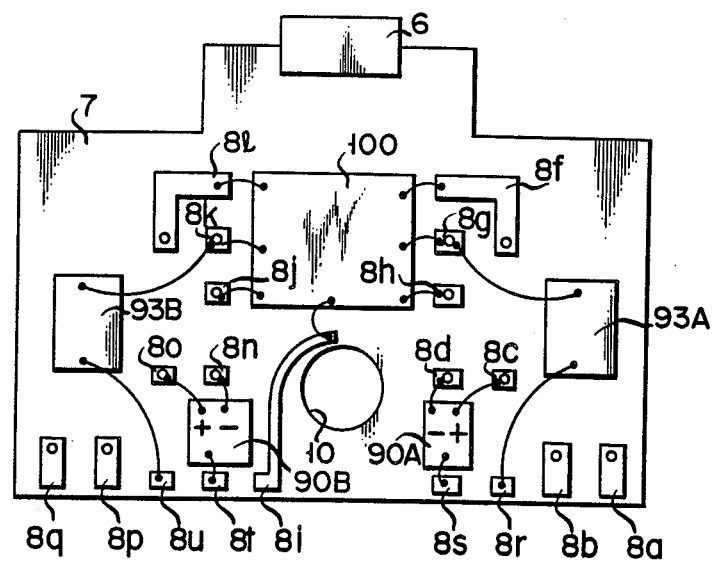

FIG. 18 shows the mounting state of the hybrid IC and is a plan view taken from the rear side of base 7. Two read/write heads and two erase heads are assembled in head chip 6. Reference symbols 8a to 8u denote conductive films of copper or the like. Circle marks attached to the conductive films indicate through holes, and electrically connect the conductive films on the front and rear sides of base 7. Conductive films 8a, 8b, 8p, and 8q serve as erase current input terminals; 8r and 8u, write current input terminals; 8s and 8t, read output terminals; and 8i, a read/write signal input terminal.

Figure 19:
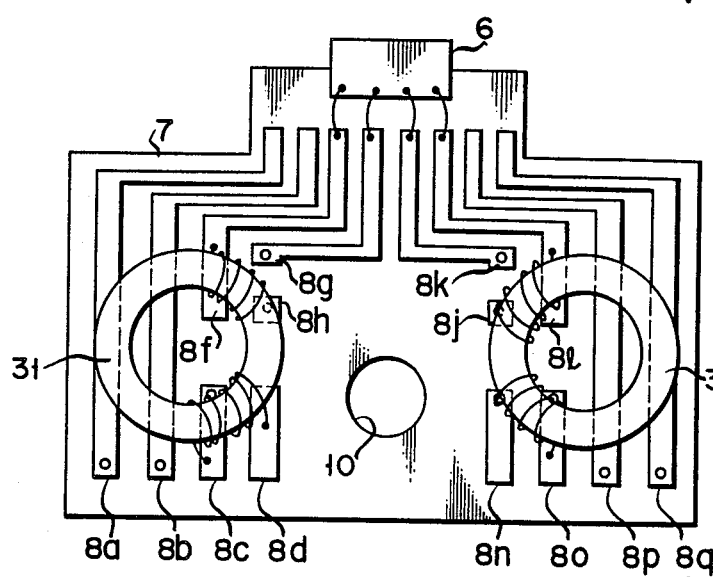
Figure 20:
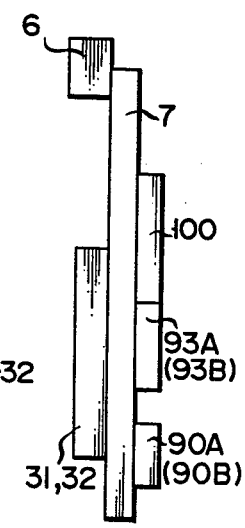

FIGS. 19 and 20 also show the mounting state of the hybrid IC and are a plan view and a side view taken from the front side of base 7. Reference numerals 31 and 32 in FIGS. 19 and 20 denote step-up transformers described above, having respective primary windings connected to terminals 8b, 8h, 8j, and 8l, and respective secondary windings connected to conductive films 8c, 8d, 8n, and 8o.

A material having a high magnetic permeability is selected as a core material for step-up transformers 31 and 32 so that a high inductance is obtained with a small number of turns. Then, the influence of noises Enp and Ens described with reference to FIG. 15 can be reduced. For example, when the primary winding has 5 turns and the secondary winding has 25 turns, a good result can be obtained. When a read amplifier which has an input capacitance of 10 pF in a single input mode, it can provide an input capacitance of 5 pF in the differential input mode. As a result, the resonate frequency of the input capacitance 5 pF and the inductance 35 $\mu$m as viewed from the secondary windings of step-up transformers 31 and 32 becomes 12 MHz, which is a critical value for read system frequency characteristics.

Figure 21:
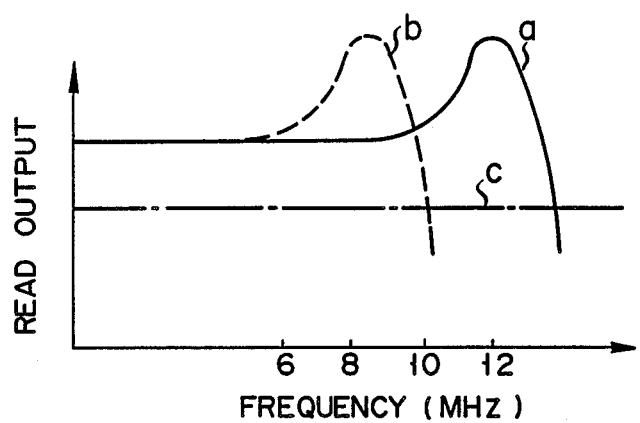
FIG. 21 shows the frequency characteristics of a read system of the sixth embodiment.
Figure 22:
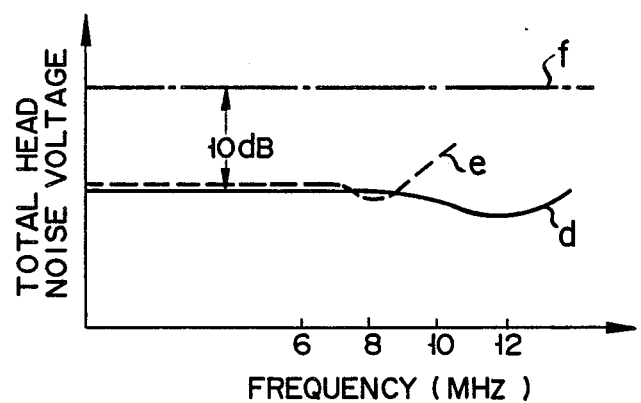
FIG. 22 shows the total head noise voltage in the sixth embodiment.

FIG. 21 shows the frequency characteristics of the read system of this embodiment, and FIG. 22 shows the total head noise voltage. In FIGS. 21 and 22, solid curves a and d show the cases wherein a step-up transformer having a primary and secondary winding turn ratio of 5:25 and a differential input read amplifier are used; dotted curves b and e show the cases wherein a step-up transformer as described above and a single input read amplifier are used; and alternate long and short dashed curves c and f show the cases wherein no step-up transformer is used and a single input read amplifier is used. As shown in FIG. 21, in curve a, resonation occurs at 12 MHz; in curve b, resonation occurs at 8.5 MHz since the input capacitance reduction effect is not obtained. In curve c, since no step-up effect is obtained, a read output is low. As shown in FIG. 22, in curve d, the noise voltage becomes minimum near resonate frequency 12 MHz. Curve e is not significantly different from curve d in a low frequency range; however, at 9 MHz or higher, the noise voltage is significantly increased. In curve f, the noise voltage is about 10 dB higher at 9 MHz or more and is still higher near 12 MHz.

In this manner, when a read amplifier comprises differential input amplifier 90 and step-up transformers 31 and 32 are used between amplifier 90 and the head, a wide-band, low-noise read system can be obtained. When read amplifier 90, write amplifier 93, and read/write switch circuit 100 are formed into a hybrid IC and mounted on a head base, degradation of frequency characteristics due to increases in external noise, stray capacitance, and lead inductance can be suppressed to a minimum, thereby allowing a compact head apparatus.

A partial modification for the respective embodiment described above will now be described.

Figure 23:
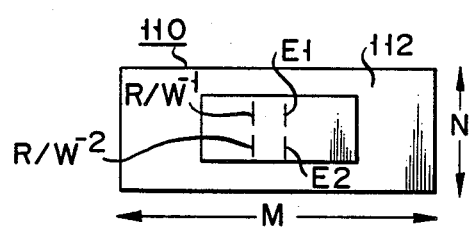
Figure 24:
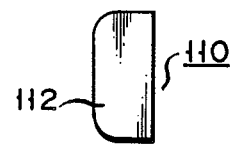
Figure 25:
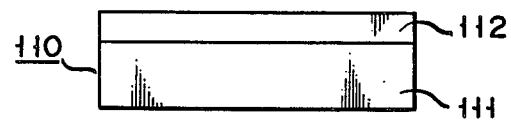

FIGS. 23 to 25 show a preferred surface shape for composite magnetic head 2 or 6 described above. As shown in FIGS. 23 to 25, in this composite magnetic head 110, disk contact surface 112 of head support base 111 which includes at least read/write gaps R/W-1 and R/W-2 and erase gaps E1 and E2 is flat in the track longitudinal direction indicated by arrow M and is curved to have a predetermined radius of curvature, e.g., a radius of curvature of 50 to 100 R in the track widthwise direction indicated by arrow N. In other words, the overall head has a U-shaped section. In composite magnetic head 110 having such a shape, the head touch with respect to disk 1 is better than with heads of other shapes according to experiments conducted.

Figure 26:
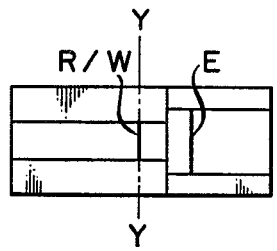
FIGS. 26 to 28 shows a composite magnetic head having a structure different from those of the composite magnetic heads shown in FIGS. 2 and 4.
Figure 27:
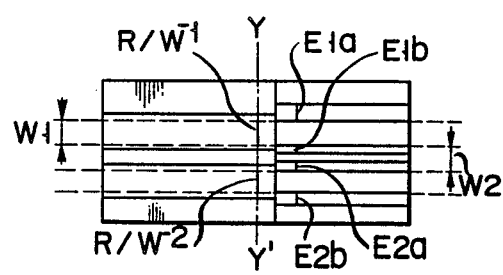
Figure 28:
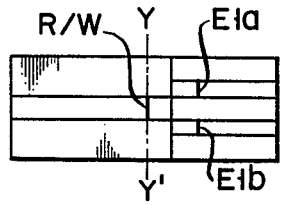

FIGS. 26 to 28 show modifications of the composite magnetic head structure. FIG. 26 shows an example of a composite magnetic head for field write, which has one read/write gap R/W and one erase gap E. FIGS. 27 and 28 show examples of a composite magnetic head for data write only; the head in FIG. 27 is for 2 tracks and the head in FIG. 28 is for a single track.

The composite magnetic heads shown in FIGS. 27 and 28 are tunnel erase type heads, wherein read/write gaps R/W-1, R/W-2, and R/W are used as overwrite head gaps. A description will be made with reference to FIG. 27. Read/write gaps R/W-1 and R/W-2 have a width larger than track width W1 (60 μm) and are used for overwrite. Two erase gaps E1a and E1b or two erase gaps E2a and E2b are used for one track to erase the written signal outside track width W1. Since the head width is larger than track width W1, read tracking is easy in the read mode. However, this head is difficult to manufacture since two erase gaps E1b and E2a must be formed within a width of guard band width W2 (40 μm) as shown in the drawing.

Figure 29:
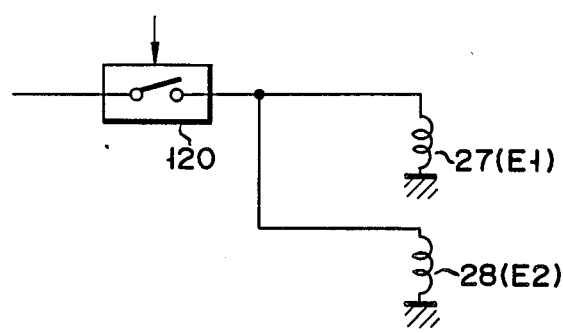
FIG. 29 is a partial diagram showing a partial modification of the control system in FIG. 7.

FIG. 29 shows a diagram wherein ON/OFF switch 120 is included in place of part of the circuit in FIG. 7, i.e., erase side switch 26. The erase operation can be performed simultaneously by erase gaps E1 and E2.

Figure 30:
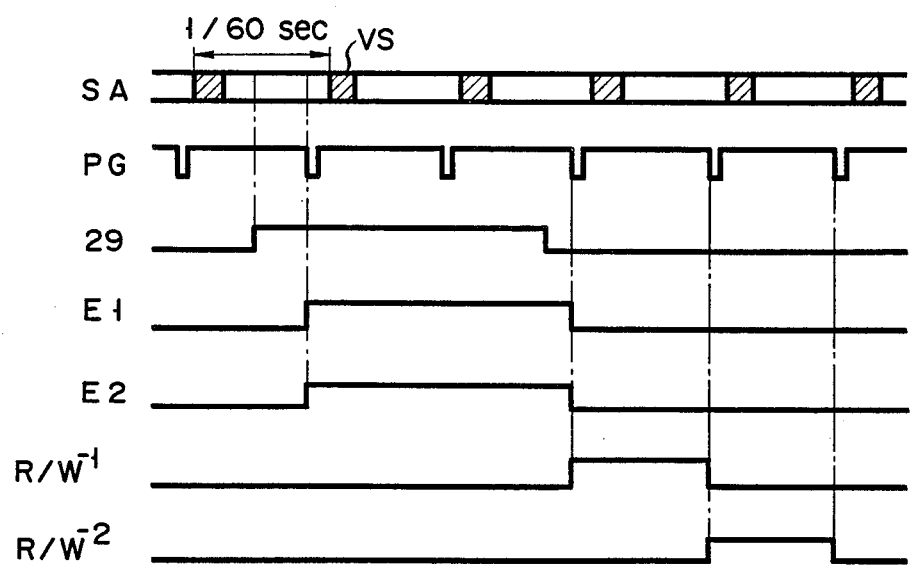
FIG. 30 is a timing chart showing the operation timing of the circuit shown in FIG. 29.

FIG. 30 is a timing chart showing the operation timing when the circuit has the configuration shown in FIG. 29. As shown in FIG. 30, the erase timings for erase gaps E1 and E2 coincide. In this modification, the erase/write cycle can be shortened compared with that in FIG. 7; erase/write can be performed at a speed of 15 rotations per second.

Figure 31:
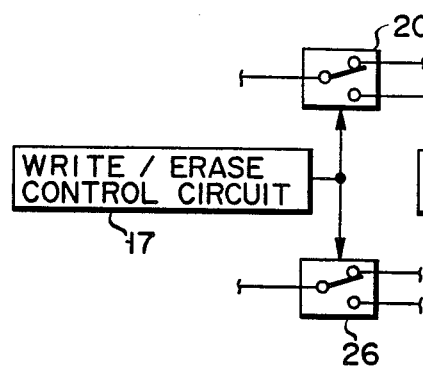
FIGS. 31 and 32 show a partial modification of the control system shown in FIG. 7.
Figure 32:
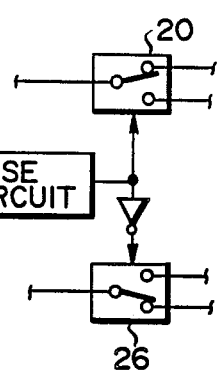

FIGS. 31 and 32 shown an example wherein read/write side switch 20 and erase side switch 26 shown in FIG. 7 are simultaneously controlled. In the case of FIG. 32, the switching directions of switches 20 and 26 are reversed by inverter 130.

Figure 33:
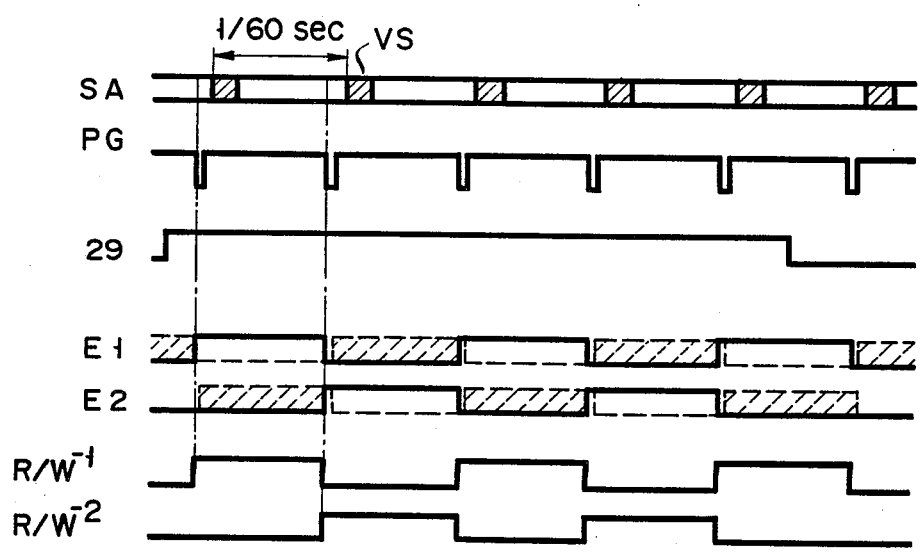
FIG. 33 is a timing chart showing operation timing of the circuit shown in FIGS. 31 and 32.

FIG. 33 shows the operation timing of the circuits shown in FIGS. 31 and 32. As shown in FIG. 33, write by gap R/W-1 and erase by gap E1 or E2 (broken line) can be activated during the same period. In addition, write by gap R/W-2 and erase by gap E2 or E1 (broken line) can be activated during the same period. When gaps R/W-1 and E1 or gaps R/W-2 and E2 are simultaneously activated, and erase and write periods completely overlap on a single track. However, as shown in FIG. 4, erase gaps E1 and E2 and read/write gaps R/W-1 and R/W-2 are separated by predetermined distance X and the erase operation leads the write operation. Therefore, no problem is encountered. In other words, the write operation is performed immediately after the erase operation. Then, erase and write can be performed 30 times per second in frame write, and 60 times per second in field write. The erase/write cycle is therefore even shorter than the case of FIG. 29. In this example, however, since some crosstalk tends to occur between the erase and read/write heads, the circuit is preferably used as an image write or digital data write circuit with a modulation scheme which is resistant to noise.

In data write, it is a great advantage if data write can be performed in two tracks without dead time in head access. When the circuit has a configuration as shown in FIG. 32 and the active periods of erase gaps E1 and E2 have the timings indicated by the broken lines in FIG. 33, write and erase operations are performed at the same timings but on adjacent tracks. Therefore, crosstalk is less than with the case shown in FIG. 31. Industial Applicability A composite magnetic head of the present invention can be easily manufactured by a simple method. If the head is distributed after being mounted on a commercially available magnetic read/write apparatus, users can reliably and accurately write various information such as image information and can perform read or rewrite immediately after the write operation, as needed. The present invention can therefore be widely applied in various fields including information transmission, leisure, and education.

We claim:

1. A composite magnetic head comprising a head chip mounted on a base, a read/write switch circuit for switching said head chip to a read or write system, a write amplifier for amplifying a write current and supplying the amplified current to said head ship when said head chip is connected to said write system by said read/write switch circuit, a step-up transformer, mounted on said base, for stepping up the level of a signal picked up by said head chip when said head chip is connected to said read system by said read/write switch circuit, and a differential input read amplifier for amplifying the signal stepped up by said step-up transformer, wherein said read/write switch circuit, said write amplifier, and said differential input amplifier are formed into a hybrid IC and mounted on said base.

2. A head according to claim 1, wherein said head chip is formed such that a plurality of thin film heads are joined such that respective head gaps are aligned at predetermined intervals in the widthwise direction of tracks.

3. A head according to claim 1, wherein said step-up transformer has a shielding case.

* * * * *

UNITED STATES PATENT AND TRADEMARK OFFICE
CERTIFICATE OF CORRECTION

PATENT NO. : 4,893,200
DATED : January 9, 1990
INVENTOR(S) : YUNOKI et al

It is certified that error appears in the above-identified patent and that said Letters Patent is hereby corrected as shown below:

Column 14, line 37 (claim 1):

"head ship" should read --head chip--.

Signed and Sealed this

Thirty-first Day of December, 1991

Attest:

HARRY F. MANBECK, JR.

*Attesting Officer*  *Commissioner of Patents and Trademarks*